United States Patent [19]

Ittmann et al.

[11] Patent Number: 5,464,898
[45] Date of Patent: Nov. 7, 1995

[54] SUSPENSIONS FOR PRODUCING FILLED CAST RESINS

[75] Inventors: Guenther Ittmann, Gross-Umstadt; Manfred Krieg, Darmstadt, both of Germany

[73] Assignee: Roehm GmbH Chemische Fabrik, Darmstadt, Germany

[21] Appl. No.: 308,613

[22] Filed: Sep. 19, 1994

Related U.S. Application Data

[63] Continuation of Ser. No. 99,555, Jul. 30, 1993, abandoned.

[30] Foreign Application Priority Data

Jul. 31, 1992 [DE] Germany ............ 42 25 309.8

[51] Int. Cl.$^6$ ............ C08K 3/22; C08K 3/36; C08K 2/00
[52] U.S. Cl. ............ 524/493; 524/583; 524/786; 523/513; 526/194; 526/221
[58] Field of Search ............ 523/513; 524/583, 524/786, 493; 526/221, 194

[56] References Cited

U.S. PATENT DOCUMENTS

| | | | |
|---|---|---|---|
| 3,847,865 | 11/1974 | Duggins et al. | 524/533 |
| 4,221,697 | 9/1980 | Osborn et al. | 252/188.3 R |
| 4,251,576 | 2/1981 | Osborn et al. | 428/331 |
| 4,734,452 | 3/1988 | Hashimoto et al. | 524/533 |
| 4,771,095 | 9/1988 | Hanisch et al. | 524/437 |

FOREIGN PATENT DOCUMENTS

| | | |
|---|---|---|
| 0197682 | 10/1986 | European Pat. Off. . |
| 0211657 | 2/1987 | European Pat. Off. . |
| 0253211 | 1/1988 | European Pat. Off. . |
| 2006197C3 | 7/1971 | Germany . |
| 3826183A1 | 2/1990 | Germany . |
| WO89/05310 | 6/1989 | WIPO . |

OTHER PUBLICATIONS

English abstract of U.S. Pat No. 4,041,008, issued Aug. 9, 1987, by Joseph M. Makhlouf, et al, entitled: Low Smoke Density Fire–Retardant Resins.

English abstract of Japanese patent JP 78,115768, published Oct. 9, 1978, entitled: Hardened Materials Having A Marble Pattern.

English abstract of European patent EP 88,633, published Sep. 14, 1983, entitled: Use Of Iron Oxide Pigments In A Poly(Methyl Methacrylate) Article.

English abstract of Japanese patent JP 60,199,616, published Oct. 9, 1985, entitled: Moldings With Onyx Appearance.

English abstract of Japanese patent JP 61,108,536, published May 27, 1986, entitled: Coarse–Surface Poly(Methyl Methacrylate) Molding Compositions.

English abstract of Japanese patent JP 61,141,653, published Jun. 25, 1986, entitled: Marble Substitutes.

English abstract of Japanese patent JP 61,209,202, published Sep. 17, 1986, entitled: Photocurable, Fire–Resistant Compositions.

English abstract of Japanese patent JP 63,222,057, published Sep. 14, 1988, entitled: Acrylic Polymer Artificial Stone.

English abstract of Japanese patent JP 63,221,151, published Sep. 14, 1988, entitled: Flame Retardant Polymethacrylate Artificial Marble.

English abstract of Japanese patent JP 01,14,138, published Jan. 18, 1989, entitled: Thermoplastic Resin Moldings With Marblelike Appearance.

Primary Examiner—Kriellion S. Morgan
Attorney, Agent, or Firm—Oblon, Spivak, McClelland, Maier, & Neustadt

[57] ABSTRACT

A cast resin suspensions comprising:
(A) 40 to 80% by weight of an inorganic filler,
(B) 60 to 20% by weight of a liquid polymerizable organic monomer, and
(C) 0 to 5 parts by weight based on the sum of (A) and (B) of a polymerizable organosilicon component as coupling agent,
wherein inorganic filler (A) is a mixture of at least two filler particle fractions having different median particle sizes, wherein the size ratio of the average particle sizes of the large and small filler particles ranges from 10:1 to 2:1 and wherein the weight ratio of the contents of large and small filler particles is from 4:1 to 1:4.

7 Claims, No Drawings

SUSPENSIONS FOR PRODUCING FILLED CAST RESINS

This application is a continuation of application Ser. No. 08/099,555, filed on Jul. 30, 1993, now abandoned.

BACKGROUND OF THE INVENTION

1. Field of the Invention

The present invention relates to suspensions for producing filled cast resins, especially those based on (meth)acrylates, that have a low viscosity, a low tendency toward structural viscosity or sedimentation of the filler particles, and provide castings having excellent flame resistance and climate stability.

2. Discussion Of The Background

Filled cast resins, especially those from (meth)acrylates, from which castings with high flame resistance and high climate stability can be produced are known.

German Patent 2,449,656 (corresponding to U.S. Pat. Nos. 4,221,697 and 4,251,576), describes stable, flowable, moldable, and hardenable masses consisting of a polymerizable organic fluid and particle-shaped, inorganic fillers obtained by dispersing a filler in the polymerizable fluid that contains a polymer dispersing agent and potentially a low-molecular weight binder, as well as other polymer components. The filler concentration can be 20 to 90% by volume, with silicon dioxide and aluminum oxide preferred as fillers and acrylates or methacrylates preferred as polymerizable fluids.

The mixtures cited in European Patent Application 0,197,682 (corresponding to U.S. Pat. No. 3,847,865) contain unsaturated urethanes, methylmethacrylate, thermoplasts, and potentially, 30 to 70 percent by weight of fillers. The fillers include silicon dioxide, calcium carbonate, talcum, alumina, or aluminum hydrate, with the use of "coupling agents", such as silanes, to bind the filler to the polymer matrix, herein preferred.

European Patent 0,218,866 (corresponding to U.S. Pat. No. 4,786,660) describes a process for producing hardenable cast resins, based on esters of (meth)acrylic acid, containing high portions of finely divided inorganic fillers and which use organosilicon compounds as coupling agents. The resulting thixotropic suspension is transformed by standing or brief heating into a fully deflocculated low-viscosity suspension.

European Patent 0,214,551 (corresponding to U.S. Pat. No. 4,826,901) describes hardenable cast resins based on flowable, hardenable polymer precursors with a content of finely divided inorganic fillers of 20 to 80% by weight and a polymerizable organosilicon compound as coupling agent. The liquid phase formed from the organic components contains an amount of lecithin of from 0.01 to 5% by weight.

German Patent 2,006,197 relates to fire-resistant, impact-resistant castings obtained by polymerization of methylmethacrylate or copolymerization of at least 50% by weight of methylmethacrylate with α, β-ethylene-unsaturated compounds in the presence of a water-soluble catalyst, a filler based on aluminum oxide and a small amount of water. The castings thus prepared contain 20 to 85% by weight aluminum oxide hydrate or aluminum hydroxide.

The aluminum hydroxide-filled cast resins based on methacrylates according to European Patent Application 0,253,211 (corresponding to U.S. Pat. No. 4,771,095) have a high content of aluminum hydroxide or aluminum oxide hydrate as a filler. The disclosed cast resins contain a mixture of at least one organosilicon compound with functional group, a silicon ester, and an organic metallic acid compound each. In the unhardened state, such cast resins have viscosities that are clearly lower than the viscosities of known analogous cast resins which do not contain the disclosed mixture.

A number of Japanese disclosures describe cast resins based on methylmethacrylate with aluminum hydroxide as a filler, and potentially organosilicon compounds as coupling agents (see Japan. Kokai Tokkyo Koho 78/115,768, JP 60/199,616, JP 61/141,653, JP 61/209,202, JP 63/222,057, JP 63/221,151, and Japanese Kokai Tokkyo Koho JP 01/014, 188.

These Japanese castings possess a marble-like appearance and good fire-resistance.

European Patent Application 211,657 (corresponding to U.S. Pat. No. 4,734,452) describes hardenable compositions of a monomer mixture consisting of an aliphatic, polyfunctional (meth)acrylate and an aromatic vinyl compound, an inorganic filler with a maximum particle diameter of 5 μm, and a catalytic content of polymerization initiator. Preferred inorganic fillers are hydrated metal oxides, e.g. aluminum hydroxide.

WO 89/05,310 describes castings made by polymerization of a stable, liquid mixture consisting of a methylmethacrylate syrup, aluminum hydroxide filler particles, and a coupling agent. The disclosed castings can be used as kitchen sinks that have a good hot water/cold water alternation stability.

German Offenlegungsschrift 3,826,183 describes flame-resistant to non-flammable, plastic-modified dispersion plasters and synthetic dispersion adhesives that consist essentially of 39 to 57% by weight of plate-like hydrargillite Al(OH), as a mixture of a component with a median particle diameter of 0.5 to 40 μm and a component with a median particle diameter between 40 and 150 μm, as well as plastic dispersion fillers consisting of 63 to 74% by weight of plate-like hydrargillite composed of three components with various median particle diameters.

The large filler particles (particle sizes >30 μm) used in the above-cited references provide suspensions having high filler content with relatively low viscosity in the suspension. However, the resulting suspensions show a strong tendency for sedimentation of the filler. Consequently, the castings formed from these cast resins are inhomogeneous. These inhomogeneities caused by sedimentation cause deformations in the desired shape of the castings, which in the case of the production of cast plates is seen as sagging of the cast plate.

If small filler particles (particle size <5 μm), such as those described in the above references, are used, filler contents of more than 60% by weight in the suspension tend to cause a sharp rise in viscosity that prohibits pourability and exhibits a distinct structurally viscous behavior. As a result of this, inhomogeneities again occur in the cast resin castings, again due to gas inclusion (e.g. air bubbles) in the suspension that are difficult to remove even upon application of a vacuum.

SUMMARY OF THE INVENTION

Accordingly, one object of the present invention is to provide a suspension for producing filled cast resins which has low viscosity, low sedimentation of the filler particles and low tendency toward structural viscosity.

A further object of the present invention is to provide filled cast resins which give castings having high homogeneity with high levels of filler and which have excellent flame resistance and climate stability.

These and other objects of the present invention have been satisfied by the discovery of cast resin suspensions comprising:

A) 40 to 80% by weight of an inorganic filler that is prepared by mixing at least two filler particle fractions with different median particle size, whereby the size ratio of the average particle sizes of the large and small filler particles is between 10:1 and 2:1 and whereby the weight ratio of the large and small filler particles is between 4:1 and 1:4, B) 60 to 20% by weight of a liquid polymerizable organic precursor that preferably contains prepolymer, and C) 0 to 5 parts by weight, based on the total of A and B, of a polymerizable organosilicon component as coupling agent.

DETAILED DESCRIPTION OF THE PREFERRED EMBODIMENTS

The present invention relates to a cast resin suspension comprising (A) 40 to 80% by weight of an inorganic filler, (B) 60 to 20% by weight of a liquid polymerizable organic monomer, and (C) 0 to 5 parts by weight based on the sum of (A) and (B) of a polymerizable organosilicon component as coupling agent, wherein inorganic filler (A) is a mixture of at least two filler particle fractions having different median particle sizes, wherein the size ratio of the average particle sizes of the large and small filler particles ranges from 10:1 to 2:1 and wherein the weight ratio of the contents of large and small filler particles is from 4:1 to 1:4.

The Inorganic Fillers (A):

Suitable fillers for use as the inorganic filler (A) of the present invention are the inorganic materials conventionally used in the preparation of cast resins. These fillers include aluminum oxides, alkali and/or earth alkali oxides, silicon dioxide and/or titanium oxide in various modifications, clays, silicates, oxides, coal, metals or metal alloys, synthetic materials such as ceramic, ground glass, porcelain, slag, or finely divided silicon oxide, quartzes, kaolins, talcum, mica, feldspar, apatite, barytes, gypsum, chalk, limestone or dolomite. It is preferred to use inorganic materials that split off flame-inhibiting substances, such as water, carbon dioxide, or sulfur trioxide, on heating. Such inorganic materials include inorganic compounds containing the water of hydration, earth alkali hydroxides, aluminum hydroxides, metal hydroxides, carbonates, hydrogen carbonates, phosphates, sulfides, hyposulfites, hypophosphates, boric acid derivatives, etc. Especially preferred is the use of aluminum hydroxide and aluminum oxide hydrate. The above inorganic fillers may be used singly or in combination thereof.

The median size of the filler particles should not exceed 100 μm (diameter), preferably 75 μm. The filler of the present invention is a mixture of at least two components whose median particle sizes satisfy the condition that the size ratio between the median particle sizes of the large filler particles and those of the small filler particles is from 10:1 to 2:1, preferably from 6:1 to 4:1 Filler particles with a particle size <0.1 μm should make up no more than 10% of the volume of all filler particles. Particle size is determined according to standard processes, wherein the largest dimensions of the particles are used for determining particle size (cf. B. Scarlett, Filtration & Separation, page 215, 1965). The mass ratio between large and small filler particles of the filler (A), ranges from 4:1 to 1:4, preferably from 2:1 to 1:2, more preferably 1:1.

It is preferred that the inorganic filler is composed so that the resulting hardened cast resin has an elastic shear modulus of at least 5 $GNm^{-1}$, preferably at least 10 $GNm^{-2}$ with the ultimate mechanical properties of the cast resins dependent on the intended application.

The filler content in the cast resins of the present invention is at least 40% by weight. The filler content should not exceed 80% by weight. Preferably, the filler content of the cast resins is from 50 to 80% by weight. The fillers can be prepared in the useful particle sizes using conventional processes, such as by breaking and grinding.

The Polymerizable, Organic Precursor (B)

A suitable liquid polymer precursor for use in compound (B) of the present invention may comprise monomers M or monomer mixtures as described in European Patent 218,866. The monomers M, preferably containing one or several prepolymers PM, are polymerized to form a polymer that is solid at room temperatures. The polymerization is preferably performed under radical polymerization conditions. The precursors (monomers M or prepolymers PM) are those used conventionally (see German Patent 2,449,656, European Patent 0,214,551, or European Patent 0,218,866), wherein the liquid polymer precursors have a viscosity of less than 5 Pa.s, preferably less than 0.5 Pa.s at the temperature planned for shaping.

Suitable monomers M include vinylic monomers or vinylidene monomers (cf. Ullmanns Enzyklopadie der Technischen Chemie, 3rd edition, Vol 14, pages 108 to 1 10, Urban & Schwarzenberg, 1963), such as vinyl esters and ethers as well as vinyl compounds, vinylic carbonyl compounds, vinyl aromatics, heterocyclic vinyl compounds, macromonomeric compounds such as unsaturated polyesters or polyurethanes, and especially derivatives of acrylic and methacrylic acid. It is preferred that monomers with the formula I:

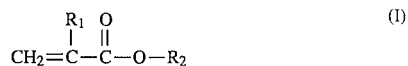

$$CH_2=\underset{\underset{R_1}{|}}{C}-\underset{\underset{}{\overset{\overset{O}{\|}}{}}}{C}-O-R_2 \quad (I)$$

wherein $R_1$ stands for hydrogen or methyl, and $R_2$ stands for a linear branched or cyclic hydrocarbon group having 1 to 18 carbon atoms. The group $R_2$ may be substituted by one or more substituents selected from halogen, hydroxy, $C_1$–$C_4$ alkoxy, di-$C_1$–$C_{12}$-alkylamino, preferably with linear, branched or cyclic $C_1$–$C_6$ alkyl residues. Preferred monomers M are compounds of formula I, wherein $R_2$ is a linear branched or cyclic hydrocarbon group having 1 to 8 carbon atoms, such as ethyl(meth)acrylate, propyl(meth)acrylate, butyl(meth)acrylate or isomers, 2-ethylhexyl(meth)acrylate, cyclohexyl(meth)acrylate, phenyl(meth)acrylate, benzyl-(meth)acrylate, and especially methylmethacrylate.

The polymer precursors (monomers M and prepolymers PM) may contain known crosslinking monomers, such as those having at least two polymerizable vinyl groups in the molecule (cf. H. Rauch-Puntigam, Th. Volker. "Acryl- und Methacrylverbindungen, page 184, SpringerVerlag, 1967), such as ethylene glycol dimethacrylate, 1,4-butanedioldimethacrylate, triglycol dimethacrylate, trimethylol propane trimethacrylate and allyl compounds such as allyl methacrylate or triallyl cyanurate. The content of crosslinking monomers in general is 0.01 to 10% by weight, preferably 0.1 to 5% by weight, based on the total amount of liquid polymer precursors M and PM. The polymer precursors preferably have a methylmethacrylate content above 50% by weight, more preferably from 80 to 100% by weight.

It is possible to use additional monomers that can be copolymerized with the formula I methacrylates as comonomers. Suitable comonomers include the above-mentioned vinyl aromatics and heterocyclic vinyl compounds such as styrene, ring substituted styrenes, α-methylstyrene, divinyl benzene, vinyl pyrrolidone, or vinyl pyridine, acrylonitrile, and methacrylonitrile, vinyl esters such as vinyl acetate or vinyl propionate, vinyl chloride or vinylidene chloride. Preferably, the portion of formula I (meth)acrylates and crosslinking monomers is >50% by weight and more preferably adds up to 100% by weight of the polymer precursor. A mixture of the monomer methylmethacrylate and a crosslinking monomer, such as glycol dimethacrylate, whereby the weight ratio ranges between 95:5 and 99.9:0.1 is most preferred.

The liquid organic polymerizable precursor (B) preferably contains prepolymers PM that are constructed of the same monomers M as the remainder of the polymerizable precursor, with the exception that the prepolymers PM do not contain any functionalized monomers. The prepolymers PM contain the monomers M in the same proportions as those stated for monomer M. The monomer components of prepolymers PM may be identical to monomers M or may be different from them. Prepolymers PM are dissolved in monomers M, but they may also be dispersed in them. The prepolymers PM preferably have median weight-average molecular weights Mw ranging between $2 \times 10^4$ and $4 \times 10^5$ Dalton (measurement by gel permeation chromatography, also cf.: H.F. Mark et al., Encyclopedia of Polymer Science and Technology, Vol. 10, pages 1 to 19, J. Wiley, 1987). The content of prepolymers PM in the liquid polymer precursors ranges from 0 to 20% by weight, preferably 0 to 10% by weight. For example, the prepolymer PM may be a copolymer of methylmethacrylate and methylacrylate in a weight ratio of 9:1 and a median weight average molecular weight Mw of ca. $2.5 \times 10^5$ Dalton.

The Polymerizable Organosilicon Component (C)

The organosilicon component (C) functions as a coupling agent between the filler and the organic phase of the cast resin, wherein conventional organosilicon coupling agents are used. These are primarily functional organosilicon compounds with at least one ethylene-unsaturated group in the molecule. The functional residue carrying the ethylene-unsaturated group is coupled to the central silicon atom by way of a carbon atom. The remaining ligands at the silicon may be alkoxy residues having 1 to 6 carbon atoms, which may also contain ether bridges in the alkyl residue of the alkoxy group. Suitable organosilicon compounds include trialkoxysilanes such as vinyl trialkoxysilanes or organosilicon compounds in which the CC double bond is connected via one or more carbon atoms to the Si atom, such as allyl trialkoxysilanes or γ-methacryloyloxypropyl trialkoxysilanes. It is also possible to use dialkoxysilanes, having an additional functional residue of the same type with a CC double bond, or an alkyl residue containing a CC double bond and having 1 to 6 carbon atoms is bound to the Si atom. Examples of suitable organosilicon components include vinyl trimethoxysilane, vinyl triethoxysilane, vinyl triacetoxysilane, vinyl tris(methoxyethoxy)silane, divinyl dimethoxysilane, vinyl methyl dimethoxysilane, vinyl trichlorosilane, γ-methacryloyloxypropyltrimethoxysilane, γ-methacryloyloxypropyltris(methoxyethoxy) silane, or mixtures thereof.

The organosilicon compounds are preferably used with catalysts of the amine type, more preferably of the type of alkyl amines having 3 to 6 carbon atoms, most preferably with n-butylamine. The amine catalyst is used in amounts ranging from 0.5 to 10% by weight, preferably 1 to 5% by weight based on the amount of the organosilicon compound (C). The weight ratio of inorganic filler (A) to organosilicon compounds (C) is between 500:1 and 20:1, preferably 75:1 to 25:1, most preferably 50:1.

Preparation of the Cast Resin Suspensions

In preparing the cast resin suspensions it is useful to start with a liquid polymer precursor (B) containing monomer M, prepolymer PM, and optionally the organosilicon component (C), to form the organic phase.

The inorganic filler (A) is added into the organic phase, preferably using a mechanical dissolver. The filler particles fractions are added individually, with no specific sequence of addition required for the filler particles with different particle sizes. The addition process takes approximately 10 minutes, although longer or shorter times are acceptable depending on the amount of filler added. The suspension is then dispersed over a period of ca. 10 minutes, using a circulation speed of the dissolver of ca. 10 to 20 meters per second. The inorganic fillers (A) are added such that the viscosity does not exceed a value of ca. 10 Pa.s.

The organosilicon compounds (C) are preferably added to the organic phase prior to the addition of the fillers. Alternatively, the filler (A) can be silanized prior to the addition to organic phase (B), by conventional processes such as dry silanization.

Conventional polymerization aids, such as polymerization initiators, are dissolved in amounts ranging from 0.1 to 5% by weight based on monomer M. The polymerization initiators used are preferably radical formers which generate radicals thermally or by way of redox processes. Suitable radical initiators are those that generate a high radical current at low temperatures (cf. J. Brandrup, E.H. Immergut, "Polymer Handbook" 3rd ed., Chapter III, pages 1 to 65, J. Wiley, 1989). It is preferred that the initiators are added immediately prior to the pouring and hardening of the cast resin suspensions.

In addition to the finely divided, inorganic fillers (A), it is possible to add additional reinforcement materials, such as fiber materials, to the cast resin suspensions of the invention. Suitable fiber materials include glass fibers, mineral fibers, or stone fibers. The content of these reinforcement materials is lower than the content of the finely divided, inorganic fillers (A).

In order to be able to prepare colored castings, conventional pigments and/or coloring agents can be added to the organic phase. Suitable pigments or coloring agents include iron oxide, titanium oxide, zinc white, ultramarine blue, and carbon black. Pigments can also be added to the organic phase in the form of previously prepared dispersions using conventional pigment dispersing agents.

The cast resin suspension optionally contains internal and/or external abherents that prevent the adherence of the hardened cast resin to the mold and provide the cast resin castings with a good surface quality. Examples of internal abherents include alkali and earth alkali salts of fatty acids and alkyl phosphates, as well as their neutralized derivatives. Suitable external abherents include coatings of polytetrafluorethylene, polyorganosiloxane, or polyvinyl alcohol on the molds.

Production of the Cast Resin Castings

The cast resin suspension of the present invention can be cast in standard casting molds. It is preferred that the suspension is subjected to a vacuum prior to casting, to remove trapped gases. The hardening (i.e., polymerization of the organic phase (B)) is preferably performed thermally, such as by heating to 50° to 80° C. for 20 to 60 minutes, wherein the hardening may take place either with or without the application of pressure.

It is possible to fill a wide variety of molds with the cast resin and to perform a technically flawless polymerization. In this way sheets, bowls, bathroom sinks, kitchen sinks, toilet bowls, castings for the construction industry, machine bases, containers, etc. can be produced.

Another embodiment of the present invention relates to the continuous production of plates on a conveyor belt. The cast resin suspension, to which a suitable polymerization initiator has been added, is applied to a running conveyor belt having lateral edges. The cast resin suspension, due to its low viscosity and low structural viscosity, then distributes and evens itself out quickly. Afterward, the surface of the suspension is covered with a second metal belt. The suspension can be hardened thermally either by heating of the two metal belts or without external heating if suitable redox initiators are used.

The residual monomer contents of the hardened cast resins of the present invention are below 1% by weight relative to the total monomer content, preferably below 0.5% by weight.

The cast resin suspension of the invention can be cast very well in the standard casting molds. This enables a large variety of shapes, especially complicated shapes, whereby a flawless and complete polymerization is ensured.

The castings that are made possible with the above mentioned cast resin suspension can be produced with low energy expenditure and personnel costs, yet high adherence to shape and low tough-up times. The flawless surface, high rigidity, strength, and flame-resistance of the castings is excellent.

Castings produced with the cast resin suspensions of the invention surprisingly possess a similarly high translucency compared to cast resins that contain exclusively large filler particles having a strong sedimentation tendency.

Having generally described this invention, a further understanding can be obtained by reference to certain specific examples which are provided herein for purposes of illustration only and are not intended to be limiting unless otherwise specified.

EXAMPLES

Example 1

30 g of Plexigum M920® were dissolved at about 50° C. for 5 hours in 296.99 g of methylmethacrylate (MMA) and 0.01 g of 2,4-dimethyl-6-tert-butylphenol, then cooled to room temperature. 5.0 g of stearic acid and 3.0 g of glycol dimethacrylate were dissolved in the resulting syrupy mixture. At the mechanical dissolver, 332.5 g ALCOA®C33 (aluminum hydroxide with a median particle size of 45 μm) and then 332.5 g ALCOA® C333 (aluminum hydroxide with a median particle size of 8 μm) were sequentially added to the syrup with moderate stiffing. The suspension was then dispersed using the dissolver at 12.5 m/sec for approximately 10 minutes.

5 g of bis-(4-tert-butylcyclohexyl)-peroxidicarbonate and 1 g of 2,2'-azo-bis(isobutyronitrile) were dissolved in the suspension at the blade mixer, and the enclosed air bubbles were quickly removed from the suspension by application of a vacuum.

A chambers was built by using two metal plates polished to high gloss and plated with chromium (4 mm thickness) and by using a round PVC rope (4.2 mm diameter). The suspension was poured into the space of the metal chamber and the chamber was closed. The filled chamber was placed into a 65° C water bath. Polymerization time was 20 minutes.

Final polymerization occurred in a drying oven for 30 minutes at 105° C. The chamber was then unmolded and the hardened casting removed. The plate casting had high gloss surfaces on both sides, did not sag, and possessed high translucency.

Control Example A 665 g ALCOA® C33 were added to a syrup according to Example 1 and dispersed with a dissolver. After addition of the initiator, the enclosed air bubbles were quickly removed from the suspension by applying a vacuum. A plate was then produced in accordance with Example 1.

The plate casting had high-gloss on the top side, but, due to filler sedimentation, had many dull places on the bottom. The plate casting was clearly bent towards the top. This bending was caused by differential polymerization shrinkage of the top and bottom sides due to filler accumulation on the bottom.

The plate casting possessed a very high translucency.

Control Example B

Analogous to Control Example A, a suspension was prepared using 665 g ALCOA® C333 instead of ALCOA® C33. The enclosed air bubbles were removed from the suspension by application of vacuum, but only with great difficulty due to foaming of the suspension. Analogous to Control Example A, the suspension was used to produce a plate casting. The plate had high gloss surfaces on both sides, did not sag, but had poor (low) translucency.

Example 2

Comparison of Properties of the Cast Resin Suspensions and the Plates Produced from Them

|  | Example 1 | A | B |
|---|---|---|---|
| Cast resin suspension |  |  |  |
| Sedimentation | none | distinct | none |
| Structural viscosity | none | none | distinct |
| Size distribution (TGV) of aluminum hydroxide particles | bimodal | monomodal | monomodal |
| Median particle size | 8; 45 μm | 45 μm | 8 μm |
| Castings according to |  |  |  |
| Bending strength (MPa) according to DIN 53452 (bottom side on traction) | 48 | 35 | 52 |
| Translucency | high | high | low |

Obviously, numerous modifications and variation of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cast resin suspension comprising
   (A) 40 to 80% by weight of an inorganic filler selected from the group consisting of aluminum hydroxide and silicon dioxide,
   (B) 60 to 20% by weight of a liquid polymerizable organic monomer, and
   (C) 0 to 5 parts by weight based on the sum of (A) and (B) of a polymerizable organosilicon component as coupling agent,
   wherein inorganic filler (A) is a mixture of at least two filler particle fractions having different median particle sizes, wherein the size ratio of the average particle sizes of the large and small filler particles ranges from 6:1 to 3:1 and wherein the weight ratio of the contents of large and small filler particles is from 2:1 to 1:2, and
   wherein component (B) comprises
   at least 50 parts by weight of monomers of the formula I:

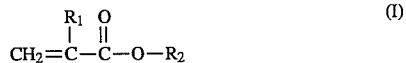

wherein
   $R^1$ is hydrogen or methyl,
   $R_2$ is a linear, branched or cyclic hydrocarbon group having 1 to 18 carbon atoms, which may be substituted by one or more substituents selected from the group consisting of halogen, hydroxy, $C_1$–$C_4$ alkoxy, and di-$C_1$–$C_{12}$-alkylamino.

2. The cast resin suspension according to claim 1, wherein said inorganic filler comprises aluminum hydroxide, aluminum oxide hydrate, or a mixture thereof.

3. The cast resin suspension according to claim 1, wherein component (B) further comprises between 0.1 and 20 parts by weight of a prepolymer that is soluble in (B), wherein the viscosity of component (B) does not exceed 5 Pa.s.

4. The cast resin suspension according to claim 1, wherein component (B) comprises at least 50 parts by weight of methylmethacrylate.

5. The cast resin suspension according to claim 1, wherein component (B) further comprises 0.01 to 10 parts by weight of a crosslinking monomer compound.

6. The cast resin suspension according to claim 1, wherein component (B) further comprises 0.1 to 5 parts by weight of a crosslinking monomer compound.

7. A casting prepared from the cast resin suspension as claimed in claim 1.

* * * * *